Figure 1:
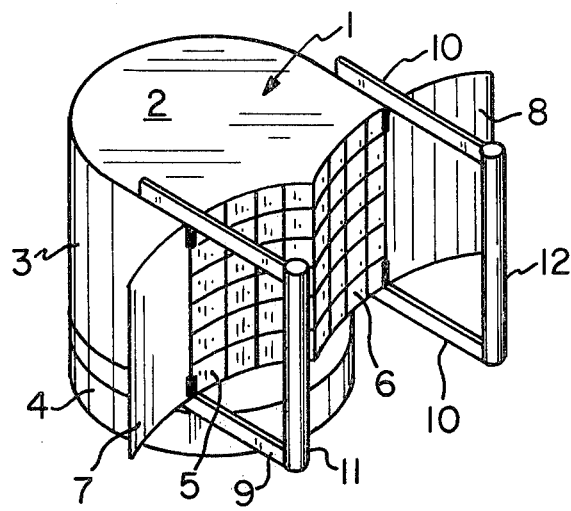

United States Patent [19]
Ratliff, Jr.

[11] 4,184,479
[45] Jan. 22, 1980

[54] GREENHOUSE WITH STORED SOLAR ENERGY CAPABILITY

[76] Inventor: George D. Ratliff, Jr., 2314 Forest Dr., Pittsburgh, Pa. 15235

[21] Appl. No.: 868,326

[22] Filed: Jan. 10, 1978

[51] Int. Cl.² .................... F24J 3/02; A01G 9/14
[52] U.S. Cl. ................................ 126/424; 47/17; 126/438
[58] Field of Search ............ 126/270, 271; 237/1 A; 47/1 R, 17, 26

[56] References Cited
U.S. PATENT DOCUMENTS
3,910,490  10/1975  Saypalia, Jr. .............. 237/1 A FOREIGN PATENT DOCUMENTS
1047892  11/1966  United Kingdom .................. 47/17

Primary Examiner—Carroll B. Dority, Jr.
Assistant Examiner—Lee E. Barrett
Attorney, Agent, or Firm—Webb, Burden, Robinson & Webb

[57] ABSTRACT

A greenhouse over an agricultural bed or the like comprising a rotating structure. At least one window in said structure lies within a generally parabolic trough surface. The window can both transmit and reflect solar energy. A heat collector is positioned along the parabolic focus of the window. Solar energy is transmitted through the window to provide instantaneous heating of greenhouse and solar energy is stored after it is gathered at the collector for heating the greenhouse when direct solar energy is no longer available.

9 Claims, 3 Drawing Figures

GREENHOUSE WITH STORED SOLAR ENERGY CAPABILITY

Prior greenhouses waste solar energy at certain times in order to prevent overheating of the inside. This is particularly the case during the midday when solar energy is most abundant. According to this invention a greenhouse stores excess solar energy for use at a later time thereby minimizing the need for auxiliary heaters which use fossil fuel.

A number of prior patents teach the use of a parabolic reflector with an elongate collector located at the focal point of the reflector to collect heat in a fluid flowing through the collector. See, for example, U.S. Pat. Nos. 3,300,393; 3,359,183; 3,414,481; 3,915,147; 3,959,056 and 3,985,119. A number of these patents also suggest that the reflector may be moved to track the sun. Also, a number of patents teach utilizing a solar panel as a portion of the roof of a structure to heat the structure. See, for example, U.S. Pat. Nos. 3,910,490; 3,991,741 and 3,994,435. None of these patents teach rotating the structure itself to orientate the solar panels. U.S. Pat. No. 3,910,490 teaches, in lines 57 to 60 of Column 1 of the specification, that collector 14 in FIG. 1 may be swiveled to change its elevation to follow the sun. This patent also discloses a garden located within the heated structure.

Briefly according to this invention, a greenhouse is provided over an agricultural bed or the like which comprises a rotating structure. Preferably, the structure has an axis of revolution generally normal to the surface of the earth. At least one window is provided in the rotating structure lying within a generally parabolic trough surface generated by a line moved parallel to a line external to the structure. The external line comprises the parabolic focus and preferably is generally normal to the surface of the earth, or forms an acute angle, say less then 45 degrees, with a line generally normal to the surface of the earth. A heat collector is positioned or positionable along the line comprising the parabolic focus. Suitable plumbing and heat storage tanks may be provided for circulating a heat exchange medium through the parabolic focus to the tanks positioned within the rotating structure. A motor is provided for automatically rotating the entire structure at a rate to cause the window to continuously face the sun. For example, the structure may be rotated continuously in the clockwise direction looking down from the top (in the Northern Hemisphere) at a rate to turn every 24 hours. Solar energy will be transmitted through the window and at the same time, solar energy will be reflected from the window to the heat collector.

According to a preferred embodiment, at least one parabolic trough shaped wing wall is hinged to the structure such that it can be rotated to lie within an extension of the parabolic surface within which the window lies, or to shutter the window. The concave surface of the wing wall should be highly reflective.

Figure 2:
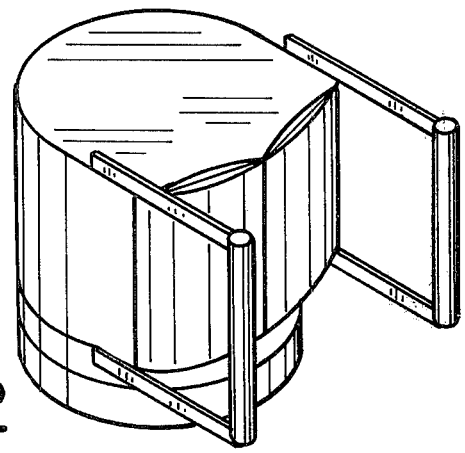
Figure 3:
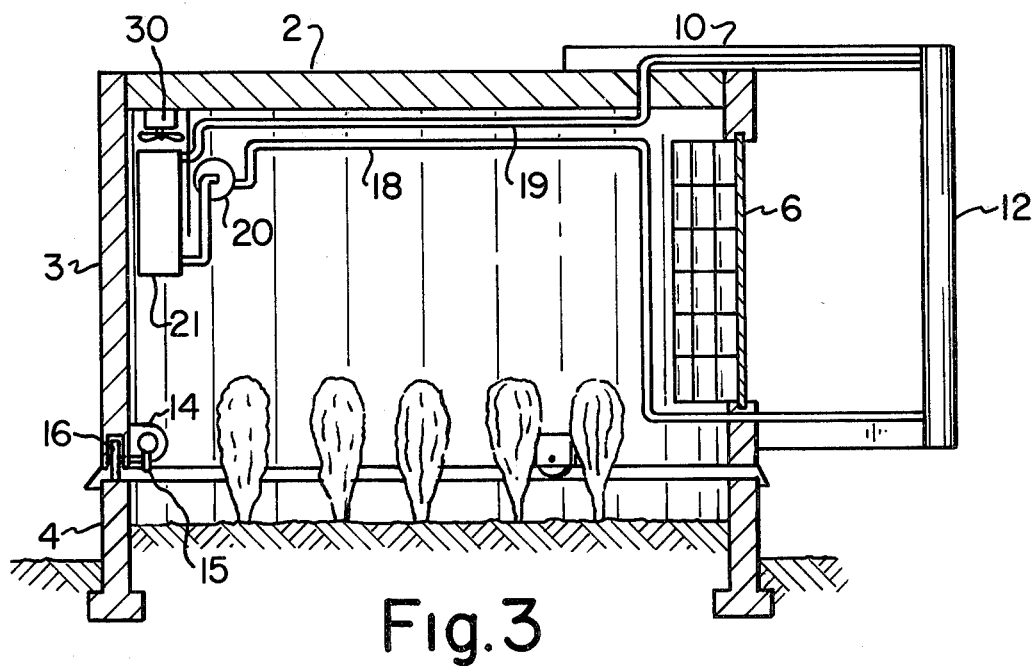

Further features and other objects and advantages of this invention will become apparent from the following detailed description of the preferred embodiment made with reference to the drawings in which:

FIG. 1 is an isometric view of a rotating greenhouse according to a preferred embodiment of this invention having two parabolic wing walls rotated into their energy gathering position, FIG. 2 is an isometric view of the structure shown in FIG. 1 with the wing walls rotated into their shuttering position, and FIG. 3 is a section through the rotating greenhouse shown in FIGS. 1 and 2.

Referring now to FIG. 1, there is shown a cylindrical structure 1 having a top 2 and side walls 3. The structure is arranged to rotate upon a circular cylindrical base 4. It has two parabolic windows 5 and 6. Hinged adjacent each parabolic window are parabolic wing walls 7 and 8. The wing walls are illustrated in a sunlight gathering position whereby the parabolic surfaces thereof lie in the same parabolic surfaces as the adjacent windows. Brackets, not shown, secure the wing walls in the sunlight gathering position. Extending outwardly from the rotatable structure 1 are two frames 9 and 10 which support collectors 11 and 12 at the focus of the parabolic windows 5 and 6. The length of the collectors exceeds the height of the windows.

FIG. 2 illustrates the parabolic wing wals rotating into a position to shutter the windows.

Referring now to FIG. 3, there is shown a section view through the structure according to this invention. The parts in FIG. 3 are numbered as in FIGS. 1 and 2. The section is taken through the axis of rotation of the structures and through the line where the two parabolic windows intersect. The base 4 of the structure has positioned on the top edge thereof a plurality of rollers 16 secured either to the base or to the side walls. A track is provided for the rollers so that the structure may rotate upon the cylindrical base. The space between the base 4 and the side walls is covered by a shield 13 on the outside of the structure. The shield may be secured either to the cylindrical side wall 3 or the base 4, but not to both. A motor 14 is secured to the wall 3 and has a gear 15 driven thereby which turns one of the rollers 16. In an alternate embodiment, the motor might be secured to the base. The motor is arranged with suitable gearing, if necessary, to turn the pinion or wheel 15 at a speed to cause a complete rotation of the cylindrical structure 1 in a 24 hour period.

The collectors 11 and 12 are typical flat-plate solar collectors except that they are glazed on the back as well as the front. Connected to the collectors are conduits 18 and 19 which place the interior of the collectors in communication with a pump 20 and a heat reservior 21. The reservoir 21 must be able to release heat when it is needed and not release heat at other times, hence the fan 30. The fan requires controls such as a thermostat. The heat reservior is simply a tank for containing heat transfer media. A fan circulates air in the greenhouse past the tank to remove heat from the tank. The collectors, of course, rotate with the rotating structure as does the associated plumbing, pump and reservior.

The operation of the above described greenhouse is substantially as follows. The parabolic windows are pointed in the direction of the sun and thereafter the motor 14 is started to maintain the parabolic windows always facing the direction of the sun during the daylight hours. This can be achieved, for example, by rotating the cylindrical structure one complete turn in a 24 hour period. In other words, the rotation of the cylindrical structure is synchronized with the earth's rotation so that reflected rays of sunlight always focus on the collector of each parabola. Sunlight reflected from either wing walls 7 and 8 or windows 5 and 6 should be focused on collectors 11 and 12. Since the collectors are longer than the wing walls and windows, they will focus the sunlight through a wide range of altitude changes of the sun. Hence, solar tracking is accomplished with a single rotary motion.

Wing walls 7 and 8 may be closed to shutter the windows at night or during storms. The wing walls are hinged to fold in front of the windows. Collectors 11 and 12 may also be hinged to fold between the mirror and glazing. They will, however, protrude above and below the windows and wing walls. For relatively shallow parabolas, the collector may be far enough from the windows and wing walls so that the collector can remain stationary when the wing walls fold to cover the windows.

Although liquid-type solar collectors are shown and described above, other types may also be used. For example, photocells may be used to collect solar energy on the collectors. In this event, the stored electrical energy may be used to power the motor that rotates the structure.

The windows may be glazed with glass. In sme instances, it may be desirable to increase the reflection from the glass with a reflective coating in order to decrease heat inside the greenhouse during the peak sun hours and to increase stored heat.

The preferred embodiment has been described with reference to a rotary greenhouse having two parabolic windows. One window or more than two windows are within the contemplation of this invention. Each window requires its own associated collector. The windows need not be curved glass or plastic but may comprise a plurality of flat panes arranged as best as possible to lie within a parabolic surface.

The collectors are commercially available. A typical flat-plate collector has pipes bonded to metal sheets. The metal sheets are coated black. The front has a glass covering separated from the metal sheet by an air space. The back usually has insulation fitted tightly against the metal sheet. In order to be applicable for the greenhouse, the collectors should be capable of receiving both direct frontal solar radiation as well as reflected solar radiation from the rear. Therefore, it will be necessary to modify a commercially available collector, removing the insulation from the back and adding glazing to the back.

Having thus defined my invention with the detail and particularity required by the Patent Laws, what is desired protected by Letters Patent is set forth in the following claims.

I claim:

1. A greenhouse over an agricultural bed or the like comprising a rotating structure over said bed having an axis of revolution generally normal to the surface of the earth,
    at least one window in said structure lying within a generally parabolic trough surface generated by a line moved parallel to a line external to said structure being the focus of said parabolic surface, said line comprising the parabolic focus being generally normal to the surface of the earth or forming an acute angle with a line generally normal to the surface of the earth,
    a heat collector positionable along the line comprising the parabolic focus,
    means for automatically rotating the structure at a rate to cause the window to continuously face the sun,
    whereby solar energy is transmitted through said window and is reflected from said window to the heat collector.

2. A greenhouse according to claim 1 wherein means are provided for shuttering the window when the sun is not out.

3. A greenhouse according to claim 1 wherein at least one parabolic trough shaped wing wall is hinged to the structure such that it can be rotated to lie within an extension of the parabolic surface within which the window lies, the concave surface of said wing wall being highly reflective.

4. A greenhouse according to claim 3 wherein said parabolic wing wall can be rotated to shutter the window with which it is associated.

5. A greenhouse according to claim 3 wherein said parabolic wing wall and said positionable heat collector fold about said hinges.

6. A greenhouse according to claim 1 wherein means are included to transfer heat gathered by the heat collector to a thermal reservoir inside the structure.

7. A greenhouse over an agricultural bed or the like comprising
    a rotating structure over said bed having an axis of rotation generally normal to the surface of the earth,
    windows in said structure lying within two generally parabolic trough surfaces generated by lines moved parallel to two parallel spaced lines external to said structure being the foci of said parabolic surfaces, said lines comprising the parabolic foci being generally normal to the surface of the earth or forming an acute angle with a line generally normal to the surface of the earth,
    heat collectors positionable along the parabolic foci,
    means for automatically rotating the structure at a rate to cause the windows to continuously face the sun whereby solar energy is transmitted through said windows and is reflected from said windows to said heat collectors.

8. A greenhouse according to claim 7 wherein two parabolic trough shaped wing walls are hinged to the structure such that they can be rotated to life within extensions of the parabolic surfaces within which the windows lie, the concave surfaces of said wing walls being highly reflective.

9. A greenhouse according to claim 8 wherein the parabolic wing walls can be rotated to shutter the windows with which they are associated.

* * * * *